(No Model.)
J. M. GETCHELL.
CORN PLANTER.
No. 379,389. Patented Mar. 13, 1888.
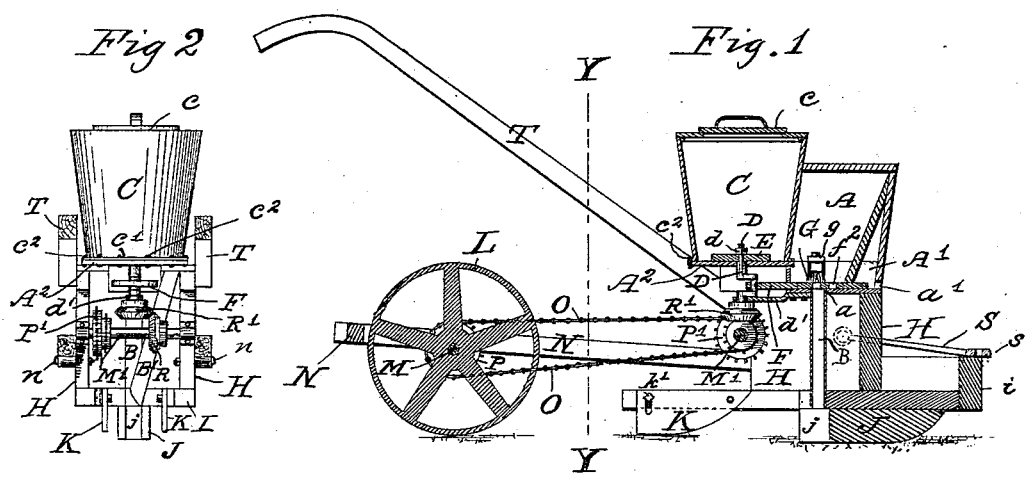
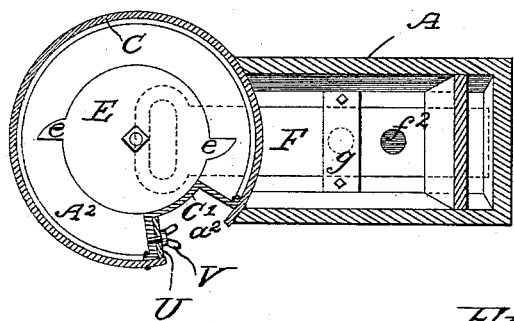
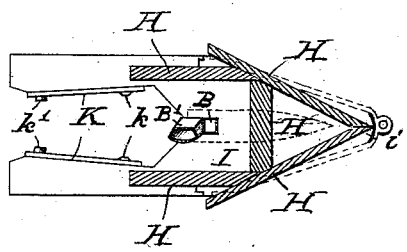
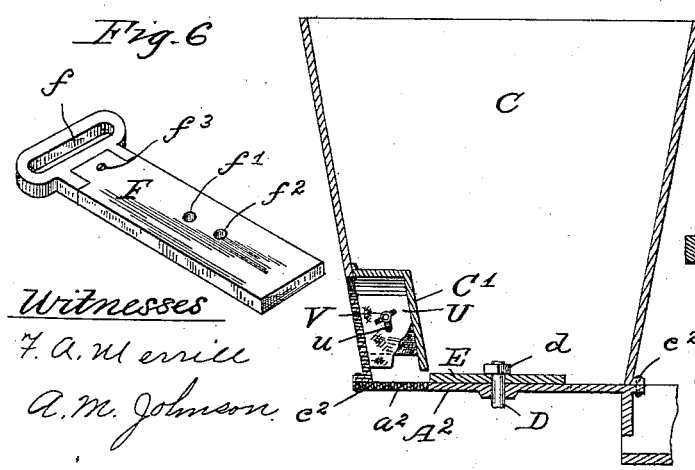
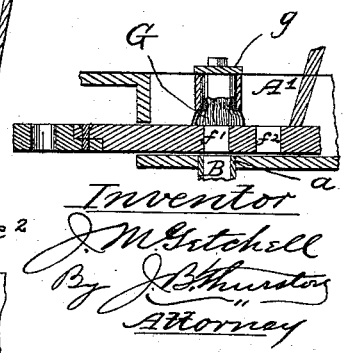
Witnesses
F. A. Merrill
A. M. Johnson
Inventor
J. M. Getchell
By J. S. Thurston
Attorney

UNITED STATES PATENT OFFICE.

JOHN M. GETCHELL, OF NORTH HAVERHILL, NEW HAMPSHIRE, ASSIGNOR OF ONE-HALF TO F. S. SLEEPER, OF SAME PLACE.

CORN-PLANTER.

SPECIFICATION forming part of Letters Patent No. 379,389, dated March 13, 1888.

Application filed January 19, 1887. Serial No. 224,743. (No model.)

*To all whom it may concern:*

Be it known that I, JOHN M. GETCHELL, a citizen of the United States, residing at North Haverhill, in the county of Grafton and State of New Hampshire, have invented certain new and useful Improvements in Corn-Planters, of which the following is a specification.

The object of the present invention is to provide a machine adapted to be drawn by a horse, with means for discharging or dropping seed and phosphate intermittently in varying quantities desired by the operator. These results are attained by the mechanism illustrated in the drawings herewith filed as part hereof, of which—

Figure 1 represents a central longitudinal sectional elevation, Fig. 2 being a cross-section showing that part of the machine seen at the right of the line Y Y in Fig. 1. Fig. 3 is a sectional plan of the phosphate and corn hoppers. Fig. 4 is a sectional plan taken below the frame carrying the drive-wheel. Fig. 5 is a vertical sectional view of the phosphate-hopper, taken through the outlet-chamber. Fig. 6 is a perspective view of the feed-plate in corn-hopper, enlarged. Fig. 7 is likewise an enlarged view of the same in longitudinal section, showing a portion of the corn-hopper, the brush, and scraper.

This machine has two hoppers—one for seed and one for fertilizer. The seed is placed in the hopper A, the lower part of which I form of cast-iron, A', in the bottom of which is an opening, $a$, connecting with a chute, B, of which more will be said hereinafter. The fertilizer is placed in the hopper C, located at the rear of the corn-hopper. This may be cylindrical and formed either of wood or iron, having a removable cover, $c$, and provided at its open bottom with an annular flange, $c'$. The bottom plate of this hopper, for convenience in connecting both hoppers, may project from the rear of the iron part A' of the corn-hopper and form a part thereof, as at $A^2$, (seen best in Fig. 5,) and the fertilizer-hopper be secured thereon by screws or rivets $c^2$. This plate $A^2$ is perforated in its center for the reception of a crank-shaft, D, the upper end of which passes through this and the fertilizer feed-plate E, and its projecting end is then threaded to a nut, $d$. That portion of said shaft which enters the plate E should be turned down smaller than the portion having its bearing in the bottom plate, $A^2$, in order that the said plate E may rest upon the shoulder thus formed and be secured to said shaft by the said nut $d$. The rotary feed-plate E is provided with two agitating-horns, $e$, located on opposite sides, operating in a manner to be hereinafter explained. The lower bearing for this crank-shaft is formed in an arm, $d'$, projected from and bolted to the bottom of the corn-hopper, as in Fig. 1. The crank on said shaft D plays within a slot, $f$, formed transversely in the rear end of the reciprocal feed-plate F, resting and adapted to slide upon the bottom of the corn-hopper. Two holes, $f'\ f^2$, are provided in the longitudinal center of said plate F, and their distance from center to center should be exactly equal to the stroke of the crank on the shaft D, or twice the length of said crank, and their position relative to either end of said plate, or from the said slot $f$, must be such as to cause the hole $f'$ to correspond with or be directly over the opening $a$ in the bottom of the corn-hopper when the said plate F shall have reached its extreme forward limit of movement. Then, when the said crank has been reversed and the said plate shall have reached its opposite limit of movement, the hole $f^2$ will be directly over the said hole $a$. By this construction it will be seen that one of the holes $f'\ f^2$, which determines the amount of seed to be planted at one time or in one hill, is kept constantly full of seed, one only being permitted to empty itself into the chute B at one time, and two deposits of corn are made at a single revolution of the crank-shaft.

To prevent any more seed being dropped at one time than is contained in either of the openings $f'\ f^2$, a partition or stationary scraper or brush, G, is secured underneath a cross-bar, $g$, fastened within the corn-hopper directly over the opening $a$, and as the sliding plate F passes to and fro under said brush no seed can get into the chute B, except that contained in either of the holes $f'\ f^2$. The quantity to be planted in each hill can be varied by changing the size of these holes $f'\ f^2$. For this reason I prefer to form the said feed-plate in two parts, as in Figs. 6 and 7, so that the part having the slot for crank-shaft may remain on said shaft, and by removing the screw $f^3$, connecting the two parts, that provided with the holes $f'$ $f^2$ may be easily slid out of corn-hopper by means of the slot $a'$ in forward end thereof, and another plate containing larger or smaller holes $f'$ $f^2$ be substituted therefor.

The seed and fertilizer hoppers are supported by boards H, rising, on either side and at the front, from a base, I, the sides of which, at the forward end, incline toward each other and converge at a central point, $i$. Directly under this point $i$ is located the sharp end of the drill-cutter or furrow-opener J, the rear end of which is slotted vertically, as at $j$, and into the upper end of said slot the chutes from both hoppers terminate. In this way both the seed and phosphate are dropped into the furrow made by the plow. The soil is then thrown over them by the coverer-plates K, which are adjustably secured at the rear of the plow J to the base I and on an angle from front to rear, substantially as seen in Fig. 4. The forward ends of these plates K are hung on pivots or bolts $k$, and their rear ends upon similar ones, $k'$; but the plates are slotted vertically for the reception of these bolts $k'$, in order that the rear part of said plates may be raised or lowered according to the depth it may be desired to plant the seed.

A suitable drive-wheel, L, may be mounted upon a shaft, M, carried in bearings placed near the rear end of a frame, N, having its forward ends pivoted by suitable bolts, $n$, to the side-boards H. Thus the said drive-wheel follows along in the track of the plow and the coverer-plates, bearing but its own weight upon the furrow or row containing the seed.

Motion is communicated to the crank-shaft D, which drives the horned plate E and the sliding feed-plate F, by the chain belt O, connecting the cone chain pulley P, mounted on the shaft M, with a similar pulley, P', mounted on the shaft M', and the bevel gears R R', mounted, respectively, upon the shaft M' and the crank-shaft D, as shown in Figs. 1 and 2.

The machine is adapted to be drawn by a horse by hitching to the eye $s$ on the forked bar S, which is pivoted to either of the side-boards H. By aid of the handles T, which are rigidly secured to the side-boards H, the driver is enabled to guide the planter as desired.

The phosphate is prevented from dropping out of the hopper C by the arched casing C', placed within the hopper C, directly over the opening $a^2$ in the plate $A^2$, and as close thereto as possible, after leaving space enough for the horns $e$ of the plate E to pass underneath. That side of this casing C' which is approached first by the horns $e$ in their rotative course is cut away, as shown in Fig. 5, so as to allow the said horns $e$ to carry more phosphate out than they could push through an opening no higher than their thickness, and by means of the sliding gate U, which may be adjusted and secured at any desired height by a screw, V, and the slot $u$, the discharge of phosphate or fertilizer is easily controlled.

By setting the fertilizer feed-plate E in various positions relative to crank-shaft D, the seed may be dropped before the fertilizer, or vice versa, or both seed and fertilizer may be placed in the furrow at the same time. A chute, B', delivers the fertilizer into the recess $j$ of the furrow-opener J, as shown in Figs. 2 and 4.

Having described my invention, what I claim as new, and desire to secure by Letters Patent, is—

1. In a corn-planter and fertilizer distributer, a rotary plate having radial projections for feeding the fertilizing material, a reciprocal plate provided with two apertures adapted to alternately carry the seed to an aperture in seed-hopper connecting with delivery-chute, and a crank-shaft carrying said rotary plate and reciprocal plate, all combined and arranged to be operated from a driving-wheel, substantially as and for the purpose set forth.

2. In a corn-planter, the combination, with the main frame, of bars N, hinged thereto and extending rearwardly therefrom, a ground-wheel mounted in said pivoted bars and having a chain pulley, a transverse shaft, M', carrying a corresponding chain pulley and a beveled gear, a second beveled gear engaging the latter and having a vertical shaft, a distributing-plate mounted on and rotatable by the vertical shaft, a feeding-slide, and connections between the slide and said actuating devices for reciprocating the same, substantially as set forth.

In testimony whereof I affix my signature in presence of two witnesses.

JOHN M. GETCHELL.

Witnesses:
J. B. THURSTON,
EDGAR H. WOODMAN.